United States Patent
Zhang (10) Patent No.: US 9,183,008 B2
(45) Date of Patent: Nov. 10, 2015

(54) METHOD AND SYSTEM FOR STARTING APPLICATION PROGRAM IN LINUX CONTAINER

(71) Applicant: Huawei Technologies Co., Ltd., Shenzhen (CN)

(72) Inventor: Honghui Zhang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 43 days.

(21) Appl. No.: 14/258,168

(22) Filed: Apr. 22, 2014

(65) Prior Publication Data

US 2014/0229951 A1    Aug. 14, 2014

Related U.S. Application Data

(63) Continuation of application No. PCT/CN2011/081168, filed on Oct. 24, 2011.

(51) Int. Cl.
| | |
|---|---|
| *G06F 3/00* | (2006.01) |
| *G06F 9/445* | (2006.01) |
| *G06F 9/54* | (2006.01) |
| *G06F 9/44* | (2006.01) |
| *G06F 9/455* | (2006.01) |

(52) U.S. Cl.
CPC ........ *G06F 9/445* (2013.01); *G06F 9/54* (2013.01); *G06F 9/4401* (2013.01); *G06F 9/455* (2013.01)

(58) Field of Classification Search
CPC ................................. G06F 9/54; G06F 9/4401
USPC ................................................ 719/310; 713/1
See application file for complete search history.

(56) References Cited

U.S. PATENT DOCUMENTS

| | | |
|---|---|---|
| 2005/0119988 A1 | 6/2005 | Buch et al. |
| 2007/0011446 A1* | 1/2007 | Kato et al. ............ 713/150 |

(Continued)

FOREIGN PATENT DOCUMENTS

| | | |
|---|---|---|
| CN | 1890643 A | 1/2007 |
| CN | 101178662 A | 5/2008 |
| CN | 101639787 A | 2/2010 |

OTHER PUBLICATIONS

Nikhil Handigol, Reproducible Network Experiments Using Container-Based Emulation, Dec. 2012.*

(Continued)

*Primary Examiner* — Lechi Truong
(74) *Attorney, Agent, or Firm* — Conley Rose, P.C.; Grant Rodolph; Nicholas K. Beaulieu (57) ABSTRACT

A method for starting an application program in a Linux container and a corresponding Linux system are provided, where the method includes: creating, by a container start process, a container according to a command entered by a user, creating a first application start process, and putting the first application start process into the container for execution; obtaining, by the first application start process, according to the command entered by the user, the number N of application programs to be started, and creating N−1 second application start processes, where N is a positive integer not less than 2; and starting, in the container, by the first application start process and the N−1 second application start processes, the N application programs to be started. By using technical solutions of the present invention, when the container is created, a plurality of application programs can be started simultaneously.

13 Claims, 4 Drawing Sheets

(56) References Cited

U.S. PATENT DOCUMENTS

2007/0169064 A1* 7/2007 Hagihara et al. ............. 717/162
2009/0217267 A1 8/2009 Gebhart et al.
2010/0122343 A1* 5/2010 Ghosh et al. ................... 726/23

OTHER PUBLICATIONS

Noordende, G., et al., "Secure and Portable Confinement of Untrusted Programs," Internet Article, 2002, 14 pages.
Peterson, D., et al., "Proceedings of the 11th USENIX Security Symposium," USENIX Association, Aug. 5-9, 2002, 20 pages.
Foreign Communication From a Counterpart Application, European Application No. 11867148.6, Extended European Search Report dated Feb. 9, 2015, 6 pages.
Foreign Communication From a Counterpart Application, Chinese Application No. 201180002154.9, Chinese Office Action dated Mar. 27, 2013, 6 pages.
Foreign Communication From a Counterpart Application, PCT Application No. PCT/CN2011/081168, English Translation of International Search Report dated Aug. 9, 2012, 2 pages.
Foreign Communication From a Counterpart Application, PCT Application No. PCT/CN2011/081168, English Translation of Written Opinion dated Aug. 9, 2012, 8 pages.

* cited by examiner

200
METHOD AND SYSTEM FOR STARTING APPLICATION PROGRAM IN LINUX CONTAINER

CROSS-REFERENCE TO RELATED APPLICATIONS

This application is a continuation of International Application No. PCT/CN2011/081168, filed on Oct. 24, 2011, which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of operating system technologies, and in particular, to a method for starting an application program in a Linux container, and a Linux system.

BACKGROUND

In a Linux system, a container can provide lightweight virtualization to isolate processes from resources. The container can effectively group resources managed by a single operating system into isolated groups, so as to better balance conflicting resource usage requirements among the isolated groups. Compared with other virtualization solutions, this solution requires neither instruction-level simulation nor just-in-time compilation. The container can locally execute an instruction in a core central processing unit (CPU) without any special interpretation mechanism, thereby avoiding complexity of paravirtualization and system call replacement.

A method for creating and entering a container is provided, and therefore an application program runs on a Linux operating system as an independent machine while sharing many underlying resources. The container provides isolation and also reduces overheads by sharing resources. Therefore, the overheads of the container are much less than that of real virtualization.

Figure 1:
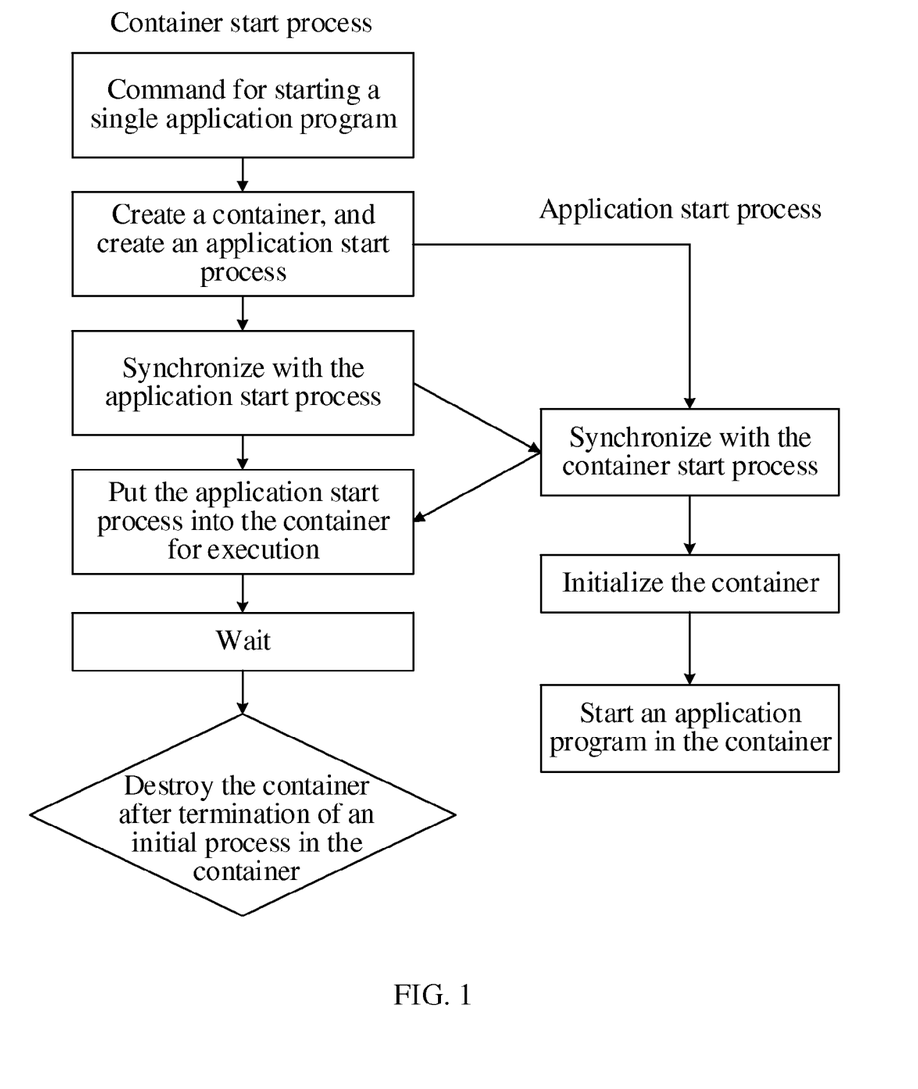
FIG. 1 is a flowchart of an existing method for starting an application program in a Linux container.

Referring to FIG. 1, a Linux container (LXC) starts an application program according to a command, such as lxc-start . . . [command], entered by a user, and the procedure is as follows:

A container start process creates a new container, and exists as a daemon of the container at the same time.

The container start process creates an application start process, and puts the application start process into the container for execution; and then the application start process initializes the container according to a command line parameter entered by a user.

The application start process starts, according to a command entered by the user by using a command line, an application program in the container, where a process of the application program is an initial (init) process in the container.

When another application program needs to be put into the container for execution, the application program needs to be started outside the container first, and a list of process identities (PIDs) of the application program is obtained; and then a PID of a current process is written into a control file to migrate a process execution environment to the container, so that the application program is executed in the container with a granularity of a process.

After a container destroying command is called, a container daemon exists as a container destroying process. The container daemon obtains a group identity (ID) of a process group in the container by using socket communication, and sends a SIGKILL signal to the process group in the container by using a kill( ) system call to terminate the process group in the container. After the container daemon detects termination of the init process in the container, the container daemon exits, and the container is destroyed.

In the foregoing existing method for starting an application program in a Linux container, only one application program can be started when a container is created, and if an additional application program needs to be started in the container, the application program needs to be started outside the container first, and then a process of the application program is put into the container for execution. Therefore, the operation is complex, and an execution environment of the application program is changed during operation. Furthermore, if the application program that needs to be started additionally is a multi-process application, PIDs of all processes of the application program need to be obtained, and a PID of the current application process is manually written into a control file for multiple times, which requires a system administrator using the container to be quite familiar with the application program so as to complete the foregoing operation that is complex and has a high probability of error. In addition, when some processes of the application program are inside the container while some processes are outside the container, a fault in the application program may be caused due to isolation of the container.

SUMMARY

Embodiments of the present invention provide a method for starting an application program in a Linux container, and a Linux system, which can start a plurality of application programs when a container is created.

A method for starting an application program in a Linux container includes: creating, by a container start process, a container according to a command entered by a user, where the container start process subsequently exists as a container daemon of the container; creating, by the container start process, a first application start process, and putting the first application start process into the container for execution; obtaining, by the first application start process, according to the command entered by the user, the number N of application programs to be started, and creating N−1 second application start processes, where N is a positive integer not less than 2; and starting, in the container, by the first application start process and the N−1 second application start processes, the N application programs to be started.

A Linux system includes a CPU, where the CPU includes a container start process unit, a first application start process unit, and one or more second application start process units; where the container start process unit is configured to create a container according to a command entered by a user, subsequently exist as a container daemon unit, create the first application start process unit, and put the first application start process unit into the container for execution; the first application start process unit is configured to obtain, according to the command entered by the user, the number N of application programs to be started, and create N−1 second application start process units, where N is a positive integer not less than 2; and the first application start process unit and each of N−1 second application start process units are configured to start one different of the N application programs to be started.

The embodiments of the present invention adopt a technical solution in which when a container is created, a first application start process is created first, the first application start process creates one or more second application start processes, and then each of the application start processes (i.e. the first application start process and the one or more second application start processes) starts one application program, so that when the container is created, a plurality of application programs can be started simultaneously by using a single command.

DETAILED DESCRIPTION

An embodiment of the present invention provides a method for starting an application program in a Linux container, which adopts a technical solution in which when a container is created, a plurality of application start processes is created, and each of the application start processes starts one application program, so that when the container is created, a plurality of application programs can be started simultaneously. A detailed description is given below.

Figure 2:
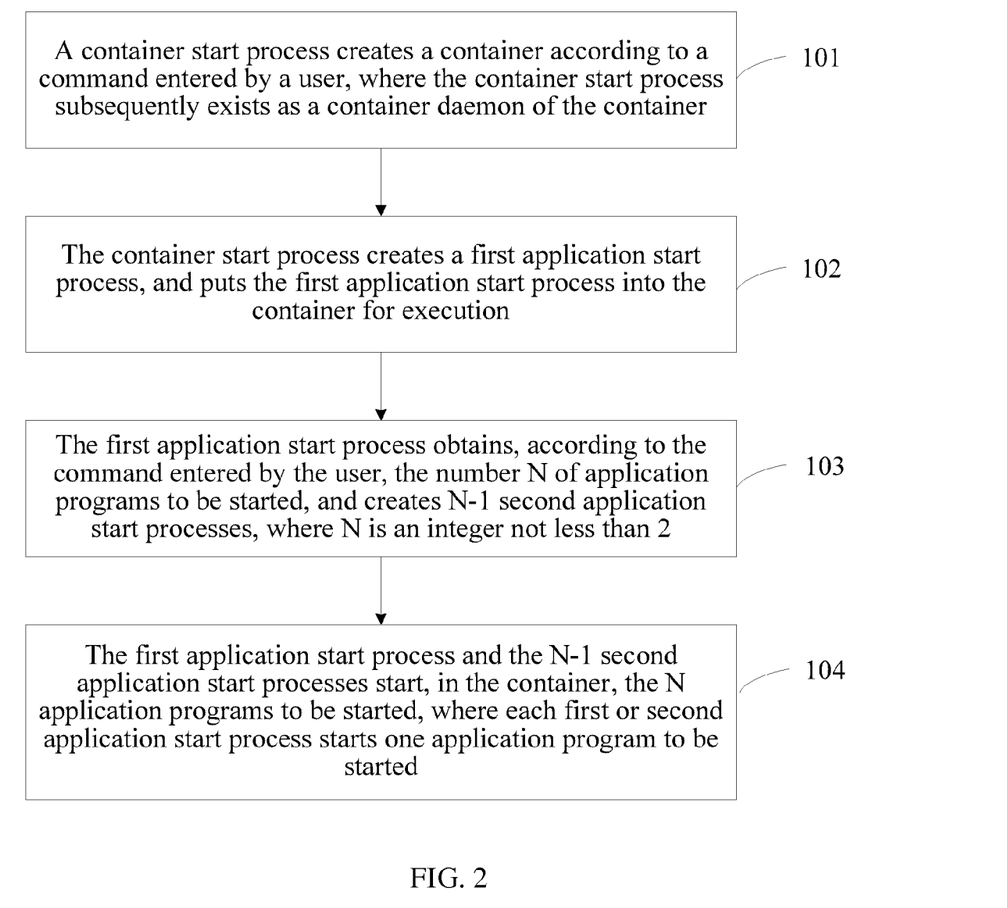
FIG. 2 is a flowchart of a method for starting an application program in a Linux container according to Embodiment 1 of the present invention.

Referring to FIG. 2, an embodiment of the present invention provides a method for starting an application program in a Linux container, including:

Step 101. A container start process creates a container according to a command entered by a user, where the container start process subsequently exists as a container daemon of the container.

In a Linux operating system (OS), a user may enter a command by using a command line to create a container in a Linux container and start an application program in the created container. The command may be lxc-start . . . [command], and command line parameters of the command include the following content: a name of a container to be created, a path name of an application program to be started, the number of application programs, and a path name of a configuration file. Herein, the name of the container and the path name of the application program are mandatory, there is a plurality of path names of application programs, and the number of application programs and the path name of the configuration file are optional.

After obtaining the command entered by the user, a current process in the OS, that is, a process used for executing the command entered by the user, functions as a container start process and creates a container according to the command line parameters. To create a container is to associate a name of a container with a configuration file. The configuration file is used for specifying an attribute of the container, for example, a host name, network, and root file system of a container, and the like, and the configuration file is established in advance. If the command line parameters do not include a path name of a configuration file, the container start process may create a container according to a default configuration file; if the command line parameters include a path name of a configuration file, the container start process may create a container according to the specified configuration file.

Step 102. The container start process creates a first application start process, and puts the first application start process into the container for execution.

After the container start process creates the first application start process, there is a procedure of synchronization between the container start process and the first application start process. In this procedure, the two processes negotiate an information exchange format so as to transmit information to each other. Then, the container start process puts the first application start process into the container for execution. In the container, the two processes may cooperate with each other or wait for each other. The first application start process is the first process executed in the container, and may be referred to as an init process.

Optionally, the first application start process may initialize the container according to a command entered by the user. The initialization includes configuring, according to a container configuration option entered by the user by using a command line, resource attributes of the container, for example, configuring information such as CPU node binding restrictions of the container.

Step 103. The first application start process obtains, according to the command entered by the user, the number N of application programs to be started, and creates N−1 second application start processes, where N is an integer not less than 2.

Command line parameters entered by the user may include the number N of application programs, which is obtained by the first application start process from the command line parameters. If the command line parameters do not include the number N of application programs, the first application start process may parse the command line parameters, count the number of path names of application programs included therein, and obtain the number N of application programs. To start the N programs, the first application start process separately creates N−1 second application start processes in the container. The first application start process may create N−1 second application start processes by using a fork( ) system call, where fork( ) is a kernel interface of a Linux system and is used to create a subprocess.

Step 104. The first application start process and the N−1 second application start processes start, in the container, the N application programs to be started, where the first application start process or each of the second application start processes starts one application program to be started.

The N application start processes may use an execvp( ) system call to start application programs, where execvp( ) is another kernel interface of the Linux system and is used to start an application program with a specified path name. Starting, in a container, by the N application start processes, the N application programs may specifically include starting, by the N application start processes, the corresponding application programs according to a set mapping relationship, where the mapping relationship is a mapping relationship between application start processes and application programs. For example, the order of PIDs of application start processes may correspond to the order of path names of application programs entered in the command line parameters. Specifically, N application start processes may correspond to N entered application programs in a descending order of PIDs, so that the application start process with the greatest PID starts the first application program, and the application start process with the smallest PID starts the Nth application program; or, the application start process with the smallest PID starts the first application program, and the application start process with the greatest PID starts the Nth application program. Certainly, other mapping relationships may also be adopted.

Optionally, after step 104, the method may further include: after obtaining a container destroying command entered by the user, terminating, by the container daemon, all processes in the container; and destroying, by the container daemon, the container when detecting termination of the initial process in the container. In this procedure, the container daemon exists as a container destroying process. It should be noted that, the container start process, the container daemon, and the container destroying process mentioned herein are actually a same process.

Here, the container daemon may obtain a group ID of a process group in the container by using socket communication, and send a SIGKILL signal to the process group in the container by using a kill( ) system call to terminate all processes in the container; or the container daemon may also obtain IDs of all processes in the container, and directly send a SIGKILL signal to all the processes separately to terminate all the processes in the container. The process group mentioned is a combination of processes in the container, including the first application start process and the N−1 second application start processes.

In the foregoing description, the embodiment of the present invention provides a method for starting an application program in a Linux container, which adopts a technical solution in which when a container is created, a first application start process creates a plurality of second application start processes, and each of the application start processes (i.e. the first application start process and the plurality of second application start processes) starts one application program, so that when the container is created, a plurality of application programs can be started simultaneously for execution in the container, thereby starting a plurality of application programs simultaneously by using a single command. In this technical solution, steps for starting an application program are simplified, and an execution environment of the application program is not changed during starting. Especially when starting a multi-process application program, a user does not need to learn what processes the multi-process application program specifically includes, and the problem that some processes are inside the container while some other processes are outside the container does not occur in the multi-process application program, and therefore no fault is caused.

Figure 3:
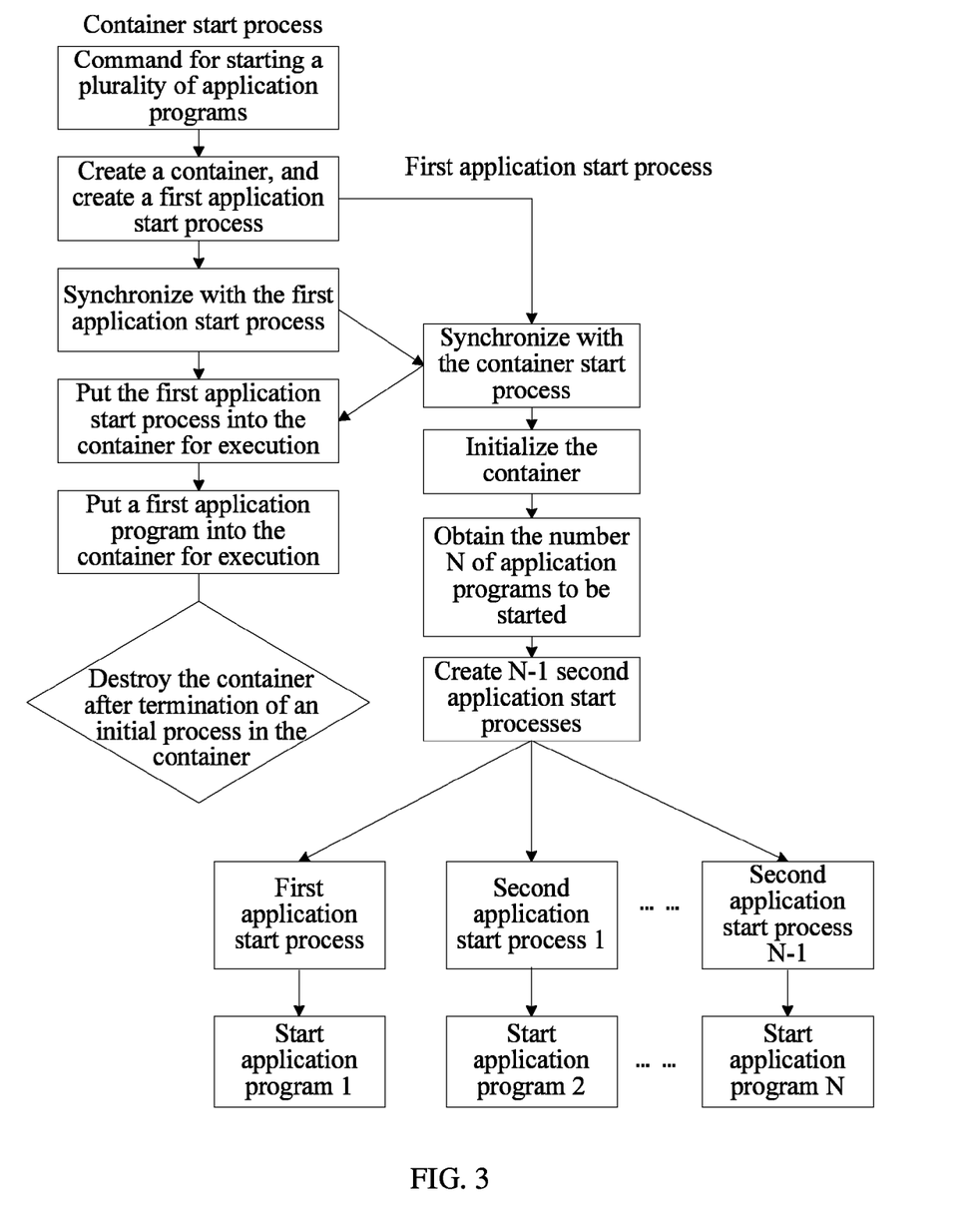
FIG. 3 is a flowchart of a method for starting an application program in a Linux container according to Embodiment 2 of the present invention.

The method provided in this embodiment is further described below in detail with reference to FIG. 3.

A user enters a command by using a command line to implement creating a container and starting a plurality of application programs in the created container, where only one command needs to be entered. The method provided in the embodiment of the present invention is described below by using a container start process and an application start process as an execution body respectively.

1. For the container start process:

The container start process creates a container according to a command entered by a user, and creates a first application start process in the container, where the container start process subsequently exists as a container daemon of the container.

Then, the container start process synchronizes with the first application start process to negotiate an information exchange format.

Then, the container start process puts the first application start process into the created container for execution.

Then, the container start process executes a function Poll that is used to put a current file pointer to a waiting queue defined in a device. The wait queue defined in this embodiment is used to wait for a container destroying command.

Then, after the user calls the container destroying command, the container daemon destroys the container.

2. For the application start process:

After being created, the first application start process first synchronizes with the container start process to negotiate an information exchange format.

Then, the first application start process initializes the container according to a command entered by the user.

Then, the first application start process obtains, according to the command entered by the user, the number N of application programs to be started, and creates N−1 second application start processes, where N is an integer not less than 2.

Then, the first application start process and the N−1 second application start processes start, in the container, the N application programs to be started, where the first application start process or each of the N−1 second application start processes starts one application program to be started.

To sum up, the embodiment of the present invention provides a method for starting an application program in a Linux container. By adopting the technical solution, a user can start a plurality of application programs simultaneously in a container by using one command when creating the container, which facilitates management and usage of the container, and enhances usability and manageability of the container.

Figure 4:
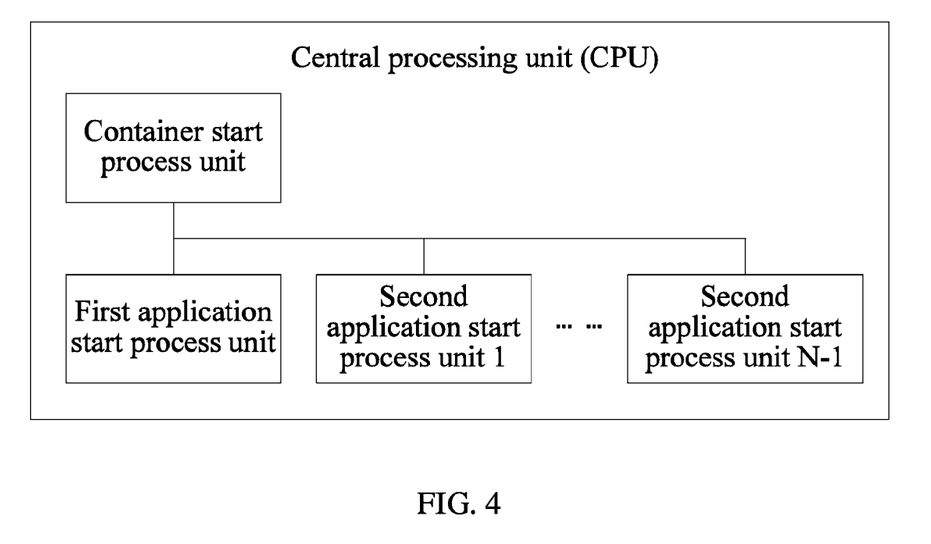
FIG. 4 is a schematic diagram of a Linux system according to an embodiment of the present invention.

Referring to FIG. 4, an embodiment of the present invention further provides a Linux system, which includes a CPU, where the CPU includes: a container start process unit, a first application start process unit, and a second application start process unit; where the container start process unit is configured to create a container according to a command entered by a user, subsequently exist as a container daemon unit, create the first application start process unit, and put the first application start process unit into the container for execution; the first application start process unit is configured to obtain, according to the command entered by the user, the number N of application programs to be started, and create N−1 second application start process units, where N is a positive integer not less than 2; and the first application start process unit and each of the second application start process units are configured to start one application program to be started.

Further, the container start process unit may include: a container creating subunit configured to obtain the command entered by the user, and create the container according to a name of the container and a path name of a configuration file, where the name of the container is specified in the command, and the path name of the configuration file is specified in the command or is set by default.

Further, the first or second application start process unit may be specifically configured to start, according to a set mapping relationship, a corresponding application program to be started, where the mapping relationship is a mapping relationship between application start processes and application programs to be started.

Still further, the container daemon unit may be further configured to terminate all processes in the container after obtaining a container destroying command, and destroy the container after detecting termination of an initial process in the container.

Further still, the container daemon unit may be specifically configured to terminate all the processes in the container by sending a SIGKILL signal to a process group in the container, or by separately sending a SIGKILL signal to all the processes in the container.

To sum up, the embodiment of the present invention provides a Linux system, where the system can start a plurality of application programs simultaneously in a container, which facilitates management and usage of the container, and enhances usability and manageability of the container.

A person of ordinary skill in the art may understand that all or part of the steps in the methods of the foregoing embodiments may be accomplished by a program instructing relevant hardware. The program may be stored in a computer readable storage medium, where the storage medium may include a read only memory, a random access memory, a magnetic disk, or an optical disc, and the like.

The foregoing describes in detail the method for starting an application program in a Linux container and the corresponding Linux system that are provided in the embodiments of the present invention. However, the descriptions of the foregoing embodiments are merely used to help understand the method and core idea of the present invention, and should not be construed as a limitation to the present invention.

What is claimed is:

1. A method for starting an application program in a Linux container, comprising:
   creating, by a container start process, a container according to a command entered by a user, wherein the container start process subsequently exists as a container daemon of the container;
   creating, by the container start process, a first application start process, and putting the first application start process into the container for execution;
   obtaining, by the first application start process, according to the command entered by the user, a number N of application programs to be started, and creating N−1 second application start processes, wherein N is a positive integer not less than two; and
   starting, in the container, by the first application start process and the N−1 second application start processes, the N application programs to be started,
   wherein starting, in the container, by the first application start process and the N−1 second application start processes, the N application programs to be started comprises starting, by the first or second application start process, according to a set mapping relationship, a corresponding application program to be started, wherein the mapping relationship is a mapping relationship between, the first application start process and the N−1 second application start processes, and the N application programs to be started.

2. The method according to claim 1, wherein creating, by the container start process, the container according to the command entered by the user further comprises:
   obtaining, by the container start process, the command entered by the user; and
   creating the container according to a name of the container and a path name of a configuration file, wherein the name of the container is specified in the command, and the path name of the configuration file is specified in the command or is set by default.

3. The method according to claim 2, wherein after starting, in the container, by the first application start process and the N−1 second application start processes, the N application programs to be started, the method further comprises:
   terminating, by the container daemon, all processes in the container after obtaining a container destroying command; and
   destroying, by the container daemon, the container after detecting termination of an initial process in the container.

4. The method according to claim 1, wherein after starting, in the container, by the first application start process and the N−1 second application start processes, the N application programs to be started, the method further comprises:
   terminating, by the container daemon, all processes in the container after obtaining a container destroying command; and
   destroying, by the container daemon, the container after detecting termination of an initial process in the container.

5. The method according to claim 4, wherein terminating all processes in the container comprises terminating all the processes in the container by sending a SIGKILL signal to a process group in the container, or by separately sending a SIGKILL signal to all the processes in the container.

6. The method according to claim 1, wherein after starting, in the container, by the first application start process and the N−1 second application start processes, the N application programs to be started, the method further comprises:
   terminating, by the container daemon, all processes in the container after obtaining a container destroying command; and
   destroying, by the container daemon, the container after detecting termination of an initial process in the container.

7. A Linux system, comprising a central processing unit (CPU), wherein the CPU is configured to:
   enable a container start process to create a container according to a command entered by a user, wherein the container start process subsequently exists as a container daemon of the container;
   enable the container start process to create a first application start process, and to put the first application start process into the container for execution;
   enable the first application start process to obtain, according to the command entered by the user, the number N of application programs to be started, and to create N−1 second application start processes, wherein N is a positive integer not less than two; and
   enable the first application start process and the N−1 second application start processes to start, in the container, the N application programs to be started,
   wherein in the enabling the first application start process and the N−1 second application start processes to start, in the container, the N application programs to be started, the CPU is further configured to enable the first or second application start process to start, according to a set mapping relationship, a corresponding application program to be started, wherein the mapping relationship is a mapping relationship between, the first application start process and the N−1 second application start processes, and the N application programs to be started.

8. The system according to claim 7, wherein in the enabling the container start process to create the container according to the command entered by the user, the CPU is further configured to enable the container start process to obtain the command entered by the user, and to create the container according to a name of the container and a path name of a configuration file, wherein the name of the container is specified in the command, and the path name of the configuration file is specified in the command or is set by default.

9. The system according to claim 8, wherein the CPU is further configured to:
   enable the container daemon to terminate all processes in the container after obtaining a container destroying command; and enable the container daemon to destroy the container after detecting termination of an initial process in the container.

10. The system according to claim 7, wherein the CPU is further configured to:
   enable the container daemon to terminate all processes in the container after obtaining a container destroying command; and
   enable the container daemon to destroy the container after detecting termination of an initial process in the container.

11. The system according to claim 10, wherein in the enabling the container daemon to terminate all processes in the container, the CPU is further configured to enable the container daemon to terminate all the processes in the container by sending a SIGKILL signal to a process group in the container, or by separately sending a SIGKILL signal to all the processes in the container.

12. The system according to claim 7, wherein the CPU is further configured to:
   enable the container daemon to terminate all processes in the container after obtaining a container destroying command; and
   enable the container daemon to destroy the container after detecting termination of an initial process in the container.

13. A non-transitory computer-readable storage medium having computer executable instructions for performing a method comprising:

enabling a container start process to create a container according to a command entered by a user, wherein the container start process subsequently exists as a container daemon of the container;

enabling the container start process to create a first application start process, and to put the first application start process into the container for execution;

enabling the first application start process to obtain, according to the command entered by the user, the number N of application programs to be started, and to create N−1 second application start processes, wherein N is a positive integer not less than two; and enabling the first application start process and the N−1 second application start processes to start, in the container, the N application programs to be started.

wherein in the enabling the first application start process and the N−1 second application start processes to start, in the container, the N application programs to be started, the CPU is further configured to enable the first or second application start process to start, according to a set mapping relationship, a corresponding application program to be started, wherein the mapping relationship is a mapping relationship between, the first application start process and the N−1 second application start processes, and the N application programs to be started.

* * * * *